April 9, 1946. W. R. FREEMAN 2,398,090
OIL SEPARATOR
Filed May 21, 1943 2 Sheets-Sheet 1
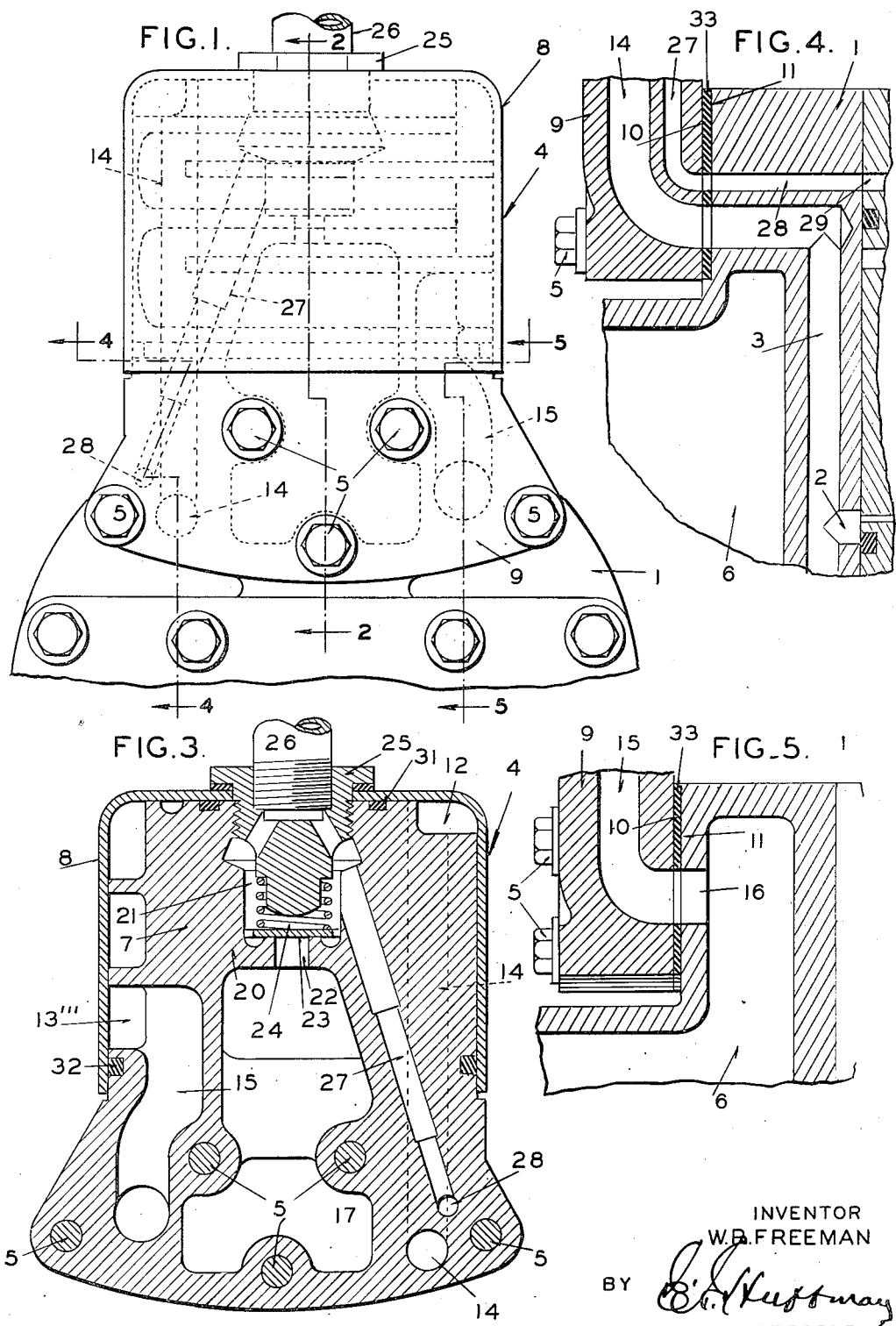
INVENTOR
W. R. FREEMAN
BY
ATTORNEY April 9, 1946.  W. R. FREEMAN  2,398,090
OIL SEPARATOR
Filed May 21, 1943  2 Sheets-Sheet 2
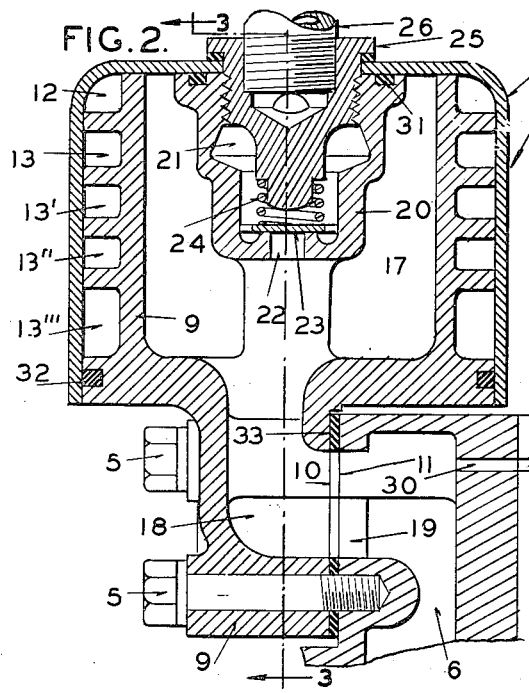
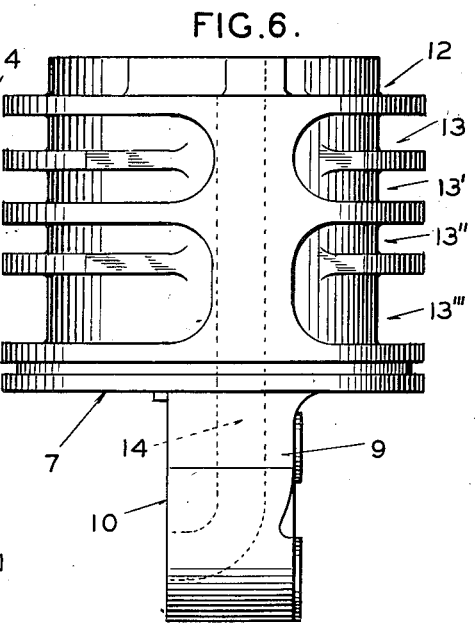
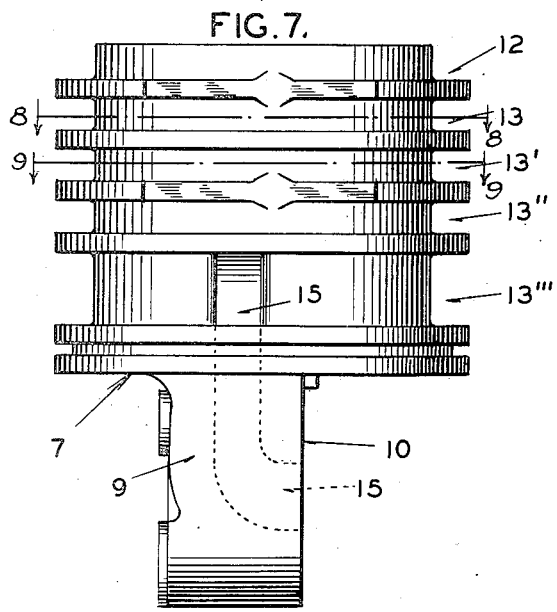
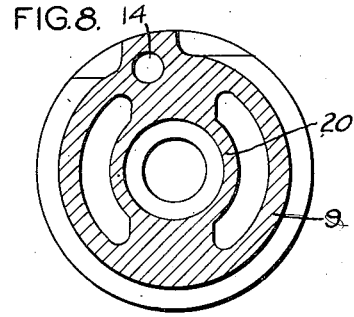
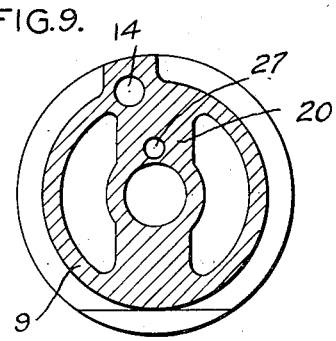
INVENTOR
W. R. FREEMAN
BY
ATTORNEY Patented Apr. 9, 1946

2,398,090

UNITED STATES PATENT OFFICE 2,398,090

OIL SEPARATOR

Walter R. Freeman, Clayton, Mo., assignor to Wagner Electric Corporation, St. Louis, Mo., a corporation of Delaware Application May 21, 1943, Serial No. 487,864

4 Claims. (Cl. 183—39)

My invention relates to oil separators and more particularly to one for extracting oil carried by a compressed fluid in the form of mist and small particles.

One of the objects of my invention is to produce an improved oil separator of the type referred to which will efficiently separate oil from compressed fluid by causing the oil carrying fluid to change its direction of flow to thereby impinge upon a plurality of surfaces and simultaneously transfer heat to the cooler atmosphere.

Another object of my invention is to so construct a compact oil separator that the oil carrying fluid will be caused to pass by a plurality of circular paths along the inner surface of a thin cylindrical shell exposed to a lower temperature and thus cause condensation of the oil carried by the fluid.

A further object of my invention is to so construct a separator that a mixture of liquid and gas passing therethrough will take such paths that streams thereof will meet while flowing in opposite directions and thus cause particles of oil in the mixture to be dropped.

Yet another object of my invention is to so construct an oil separator and associate it with a fluid compressor outlet and a compressor oil reservoir that the oil separator will be capable of efficiently dissipating heat from the fluid and efficiently cooling and extracting the oil prior to the return of the oil to the reservoir.

Other objects of my invention will become apparent from the following description taken in connection with the accompanying drawings in which Figure 1 is a view showing an end portion of a compressor and an associated oil separator embodying my invention, parts being broken away; Figure 2 is a sectional view taken on the line 2—2 of Figure 1; Figure 3 is a sectional view taken on the line 3—3 of Figure 2; Figures 4 and 5 are sectional views taken on the lines 4—4 and 5—5, respectively, of Figure 1; Figures 6 and 7 are views of opposite sides of the body member of the separator showing details of the groove construction; and Figures 8 and 9 are sectional views taken along the lines 8—8 and 9—9, respectively, of Figure 7.

Referring to the drawings in detail, numeral 1 indicates an end plate member of a rotary compressor which has therein the outlet port 2 for the compressor and a drilled passage 3 for placing said outlet port in communication with my novel oil separator generally indicated by the numeral 4 and secured to the end plate member by bolts 5. The end plate member is also so formed as to provide an oil reservoir 6 for furnishing lubricant to the working parts of the compressor (not shown) which include the rotor and rotor shaft. The reservoir is adapted to receive oil which is separated from the compressed air and to be subject to the pressure of the compressed air so that the oil from the reservoir can be forced into the compressor. The manner in which this is done will become apparent.

The oil separator 4 comprises essentially a cast body member 7 and a cup-shaped shell 8. The lower portion of the body member is formed with an extension 9 having a mounting face 10 for cooperation with a mounting face 11 on the end plate member 1. The body member is of general cylindrical shape and has a circular groove 12 adjacent its top. Below this top groove is a plurality of axially spaced grooves 13, 13', 13'', and 13'''. These latter grooves extend around the body member less than the circumference. On one side the body portion is so formed as to cause the top groove 12 to communicate with the central part of groove 13 and the central part of groove 13' to communicate with the central part of groove 13''. Also, the body member is formed so that the ends of groove 13 communicate with adjacent ends of groove 13' and the ends of groove 13'' communicate with adjacent ends of groove 13'''. The top groove 12 on the side opposite where it communicates with groove 13 is connected to a passage 14 drilled in the body member and extending to face 10 of extension 9 where it aligns with the previously mentioned passage 3 in the end plate member. Thus air under pressure carrying oil in the form of small particles and a mist and coming from the outlet of the compressor can pass to the top groove 12 and from there pass back and forth through grooves 13, 13', and 13'' and then progress to the bottom groove 13'''. This bottom groove between its ends connects with a passage 15 extending into face 10 of the body member extension 9 where it is in alignment with the open end of a passage 16 in the end plate, which passage opens into the top of reservoir 6.

When the cup-shaped shell 8 of the separator is in surrounding position to the body member, all the grooves will be closed and form conduits in which the air under pressure will flow. It will be obvious from the drawings that when air under pressure enters the top grooves 12 from the compressor by way of passage 14, this air will divide and flow to the opposite side of the body of the separator. These two streams of air will then meet while flowing in opposite directions and then enter groove 13 where a division will take place again. This divided air will form two streams and flow in opposite directions in groove 13 to the ends thereof where they will enter the ends of groove 13' and have their directions of flow reversed. The two streams of air will meet in the center of groove 13' and enter groove 13" where a division will take place again. The two streams will now flow to the ends of groove 13" where each will be reversed and enter the ends of groove 13'". When they meet again in the center of groove 13'", they will pass out of the separator through passages 15 and 16 to the top of the reservoir. In passing through the separator, the air is caused to flow along the thin wall of the shell and since this thin wall is exposed to atmosphere which will be at a lower temperature than the air coming from the compressor, the air will be cooled and because of this, particles of oil carried in the air will become condensed on the walls of the groove and the shell from whence it can flow down and out of passage 15 together with the air and thus return to the reservoir. In addition to the particles of oil being extracted due to a reduction in temperature of the air as it passes through the reservoir, the air is caused to change directions many times and when this change in direction is made, the air will impinge upon the curved walls at the point of turning, thus causing additional particles of oil to be extracted, which oil will flow down into the reservoir in the same manner as that extracted due to cooling. It is also to be particularly noted that in flowing to the reservoir the air is also divided and then allowed to meet again. At these points of meeting the air is flowing in opposite directions. When the air meets, a turbulence will be created causing the air to impinge upon all the adjacent surfaces. This directing of the flow of the two streams of air so that they will meet "head-on" will result in additional oil being extracted. Thus, as a result of the lowering of the temperature, the sharp changing of the direction of flow of the air, and the directing of the streams of air against each other, substantially all the oil carried by the air will be extracted by the time the air passes completely through the separator. All three actions will take place in the separator and the combined effect will produce better results than if only one or two of the actions were used.

The central part of the body member of the separator is formed with a hollow chamber 17 which is in communication with the top of the reservoir. A passage 18 extends to face 10 on extension 9 where it aligns with an opening 19 in face 11 of the end plate member, said opening communicating directly with the top of the reservoir. Positioned across the chamber 17 is an integral bridge 20 in which is formed a compartment 21 communicating with chamber 17 by an opening 22. This opening 22 is controlled by a check valve element 23 normally biased to closed position by a light spring 24 interposed between the valve element and a fitting member 25. This fitting is screwed into bridge 20 and also acts as a means for clamping the cup-shaped shell 8 to the body member. The fitting connects pipe 26 to compartment 21, said pipe leading to a storage tank or any other place where it is desired to conduct the compressed fluid which has had the oil extracted therefrom after coming from the compressor. The path of the compressed fluid, after entering the oil reservoir, is by way of opening 19 in the top of the reservoir, passage 18, chamber 17, opening 22, and compartment 21.

The check valve 23 prevents fluid which has passed out through pipe 26 from returning to the separator and allows the oil reservoir to be unloaded, that is, connected to atmosphere, so that the oil therein will not be under pressure when the compressor is not operative. Since the compressor is generally provided with an unloading valve which is caused to be operated when a predetermined pressure has been placed in the storage tank, the storage tank is connected to the unloading valve (not shown) without the use of any outside piping. This is accomplished by the angular passage 27 in the body of the separator. The upper end of passage 27 communicates with compartment 21 above the check valve 23. The lower end of passage 27 extends to face 10 and aligns with passage 28 in the end plate which communicates with the control valve mechanism by way of passage 29 (Figure 4). A passage 30 in the end plate (Figure 2) also communicates with the unloading valve mechanism and through it to the atmosphere to thus unload the reservoir.

In order that the shell and body member may be properly sealed, suitable packing rings 31 and 32 are provided adjacent the top and bottom of the cup. The two face surfaces on the separator and the end plate have a gasket 33.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a separator for extracting liquid from a mixture of liquid and gas, a cylindrical body portion, an enclosing shell for said body constructed and arranged to conduct heat away from said body, a circular peripheral groove formed between the body and shell adjacent one end of the device, a plurality of secondary peripheral grooves extending through less than a complete circumference, said secondary grooves being also formed between the body and the shell and axially spaced from the circular groove and from each other to form a concentric series, the individual grooves of alternate pairs of grooves being connected together at their central parts, the individual grooves of other alternate pairs of grooves being connected together at their ends whereby said series of grooves form a tortuous passage with reverse bends, a supply port leading to one end of said passage, and an exhaust port leading from the other end of said passage, the liquid condensing in said grooves as the gas and liquid flow therethrough, said liquid in condensed form separating from the gas when they flow from said exhaust port.

2. In a separator for extracting liquid from a mixture of liquid and gas, a cylindrical body portion having a central chamber therein, a shell enclosing said body constructed and arranged to conduct heat from said body, a pair of continuous tortuous passages with reverse bends situated between said body and shell, said passages formed by suitably constructed ridges on said body engaging said shell, a bridge in said chamber, a compartment in said bridge communicating with the chamber, a check valve controlling said communication, a port communicating with the compartment at the side of the check valve opposite the chamber communication, a supply port leading to one end of the passage, and an outlet port leading from the other end of said passages, the liquid condensing in said passages as the gas and liquid flow therethrough, said liquid in condensed form separating from the gas when they flow from said exhaust port.

3. In a separator for extracting liquid from a mixture of liquid and gas, a cylindrical body portion having a central chamber therein, a shell enclosing said body constructed and arranged to conduct heat from said body, a mounting member for said body, a tortuous passage with reverse bends situated between said body and shell formed by suitably shaped and spaced ridge members on said body and engaging said shell, a bridge in said chamber, a compartment in said bridge having a communication with the chamber, a check valve controlling said communication, a port communicating with the compartment at the side of the check valve opposite the chamber communication, a port communicating with the chamber, and supply and exhaust ports for the passage, all four of said ports terminating in the flat contact face of the mounting member, the liquid condensing in said passages as the gas and liquid flow therethrough, said liquid in condensed form separating from the gas when they flow from said exhaust port.

4. In a separator for extracting liquid from a mixture of liquid and gas, a cylindrical body having a chamber therein, a mounting member for said body having a flat contact face, means in said body having a valve chamber therein, said valve chamber connected with said chamber in said body, a valve in said valve chamber, a shell enclosing said body constructed and arranged to conduct heat from said body, means on said body cooperating with said shell to form tortuous passageways having a plurality of reverse bends therein, said mounting member having a supply port therein connected with one end of each of said passageways, said mounting member having an exhaust port therein connected to the other end of said passageways and connected to said valve chamber, the liquid condensing in said passageways as the gas and liquid flow therethrough, said liquid in condensed form separating from the gas when they flow from said exhaust port.

WALTER R. FREEMAN.